United States Patent Office 2,887,509
Patented May 19, 1959

2,887,509

HYDROXYBENZOYL BENZOATE SALT OF β-(o-CHLOROPHENYL)-β-HYDROXYETHYL ISOPROPYLAMINE

J. Frank Nash, Indianapolis, Ind., assignor to Eli Lilly and Company, Indianapolis, Ind., a corporation of Indiana No Drawing. Application November 5, 1956
Serial No. 620,172

1 Claim. (Cl. 260—501)

This invention relates to salts of substituted phenylisopropylamines and more particularly to N-[β-(o-chlorophenyl)-β-hydroxyethyl] - isopropylamine o-(4'-hydroxybenzoyl) benzoate, represented by the following formula:

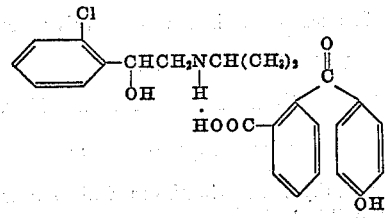

N-[β-(o-chlorophenyl)-β-hydroxyethyl]-isopropylamine is an orally active, highly effective sympathomimetic amine which has excellent bronchodilator activity, but has only relatively mild side effects. Such side effects as do exist, are merely a minor increase in blood pressure and a mild degree of bradycardia, these effects appearing when the amine is given in the form of its usual soluble acid addition salts.

It is an object of this invention to provide a salt of N-[β-(o-chlorophenyl)-β-hydroxyethyl] - isopropylamine which substantially completely eliminates any side effects when the compound is administered orally to relieve bronchospasm. A further object of the invention is to provide a salt of N-[β-(o-chlorophenyl)-β-hydroxyethyl]-isopropylamine which is especially useful for pharmaceutical purposes.

In accordance with the above and other objects of this invention, I have discovered that the o-(4-hydroxybenzoyl) benzoate salt of N-[β-(o-chlorophenyl)-β-hydroxyethyl]-isopropylamine is effective orally to relieve bronchospasm without concomitant side effects.

The o-(4-hydroxybenzoyl) benzoate salt of my invention is only slowly hydrolyzed even in relatively strong acid, such as hydrochloric acid, and therefore apparently is not converted in the stomach to the rapidly absorbed N-[β-(o-chlorophenyl)-β-hydroxyethyl] - isopropylamine hydrochloride. Although absorption may take place to a slight extent from the stomach, it appears that the major portion of the substance is absorbed from the duodenum and small intestine. The rate of absorption appears to be relatively slow, so that essentially no side effects are noted, but nevertheless, the degree of bronchodilatation which is achieved actually is substantially the same as that produced by an equivalent amount of the hydrochloride or other relatively soluble salt of N-[β-(o-chlorophenyl)-β-hydroxyethyl]-isopropylamine.

The o-(4-hydroxybenzoyl) benzoate of N-[β-(o-chlorophenyl)-β-hydroxyethyl]-isopropylamine is a white, crystalline solid which is only slightly soluble in water. It is substantially insoluble in nonpolar organic solvents but is appreciably soluble in the polyethylene glycols and in dimethylformamide.

The following example illustrates the preparation of the salt of my invention.

Example 1

To a solution of 279 g. of o-chloroacetophenone in 2 l. of anhydrous diethyl ether were added about 3 g. of dibenzoyl peroxide. Five grams of bromine were added to the resulting solution, and after three minutes, the color of bromine had been discharged, indicating that the formation of ω-bromo-o-chloroacetophenone had been initiated. A further amount of 288 g. of bromine was added dropwise to the reaction mixture over a one and one-half hour interval. After the addition of the bromine had been completed, the reaction mixture was stirred for one-half hour and poured over about 1 kg. of crushed ice. After the ice had melted, the resulting aqueous and ethereal layers were separated. The ethereal layer containing ω-bromo-o-chloroacetophenone was washed with successive 500 ml. quantities of water, 5 percent sodium carbonate solution, and again with water to remove the hydrogen bromide formed as a by-product in the reaction. The ethereal layer was dehydrated by contacting with anhydrous magnesium sulfate. The drying agent was removed by filtration and the ether was evaporated from the filtrate. The residue remaining after the evaporation consisted of about 400 g. of ω-bromo-o-chloroacetophenone.

A solution of 400 g. of ω-bromo-o-chloroacetophenone in one liter of methanol was cooled to about 25° C. A cold solution of 92.5 g. of sodium borohydride in one liter of methanol was added as rapidly as possible to this cooled solution while maintaining the temperature below about 25° C. After the addition had been completed, the reaction mixture was allowed to stand for four hours at ambient room temperature, to complete the reduction of the keto group of the ω-bromo-o-chloroacetophenone. The reaction mixture containing a mixture of o-chlorophenyl ethylene-β-bromohydrin and o-chlorophenyl ethylene oxide was then evaporated in vacuo at room temperature to a syrup which was poured into about one liter of 5 percent hydrochloric acid to decompose any borate-alcohol complexes. The two compounds were dissolved in diethyl ether by extracting the acidic layer three times with successive 500 ml. portions of diethyl ether. The combined ether extracts were dried over anhydrous magnesium sulfate and filtered, and the ether was removed by evaporation in vacuo. A residue consisting of 400 g. of a mixture of o-chlorophenyl ethylene-β-bromohydrin and o-chlorophenyl ethylene oxide was obtained.

Four hundred grams of a mixture of o-chlorophenyl ethylene-β-bromohydrin and o-chlorophenyl ethylene oxide were dissolved in one liter of anhydrous ethanol. To this solution was added a solution of 306 g. of isopropylamine in one liter of anhydrous ethanol. The reaction mixture was heated at refluxing temperature for about sixteen hours, thus forming N-[β-(o-chlorophenyl)-β-hydroxyethyl]-isopropylamine. The solvent was removed in vacuo, and to the residue was added a solution containing 200 ml. of 12 N HCl in 2500 ml. of water. The acidic solution was washed twice with 500 ml. portions of ether which were discarded. The acidic layer was then made basic by the addition of 250 ml. of 5 percent (w./v.) sodium hydroxide, thus liberating the free base of N-[β-(o-chlorophenyl) - β - hydroxyethyl] - isopropylamine. The free base was extracted with two successive one liter portions of diethyl ether. The combined ether extracts were dried over anhydrous magnesium sulfate, filtered and concentrated in vacuo to remove all of the solvents. N-[β-(o-chlorophenyl) - β - hydroxyethyl] - isopropylamine was thus obtained.

The N-[β-(o-chlorophenyl)-β-hydroxyethyl]-isopropylamine obtained by the foregoing procedure was dissolved in about 3 l. of ether and dry hydrogen chloride gas was bubbled into the solution until it was saturated, whereupon the hydrochloride salt of N-[β-o-chlorophenyl)-β-hydroxyethyl]-isopropylamine precipitated. The salt was separated from the ether by filtration, and was dissolved in 2 l. of anhydrous ethanol. The alcoholic solution was decolorized with charcoal and filtered. Three liters of anhydrous ether were added thereto and the N-[β-(o-chlorophenyl-β-hydroxyethyl]-isopropylamine hydrochloride precipitated in crystalline form as the monohydrate. The mixture was maintained at about 0° C. for forty hours and then filtered. The filter cake was washed with ether and dried. About 209 g. of N-[β-(o-chlorophenyl)-β-hydroxyethyl]-isopropylamine hydrochloride monohydrate, melting at about 163–164° C., were obtained.

*Analysis.*—Calculated for $C_{11}H_{16}ONCl \cdot HCl \cdot H_2O$: Cl, 28.52; N, 5.60. Found: Cl, 28.38; N, 5.42.

A solution of the sodium salt of o-(4-hydroxybenzoyl) benzoic acid was prepared by admixture of 266.2 g. (1.1 mols) of o-(4-hydroxybenzoyl) benzoic acid and 60 g. (1.5 mols) of sodium hydroxide in 15 l. of water. The solution was filtered and thereto was added slowly with stirring a solution of 250 g. (1 mol) of N-[β-(o-chlorophenyl)-β-hydroxyethyl]-isopropylamine hydrochloride in 3 l. of water. A white, crystalline solid material comprising the o-(4-hydroxybenzoyl) benzoic acid salt of N-[β-(o-chlorophenyl)-β-hydroxyethyl] - isopropylamine formed. It was removed by filtration and dried in vacuo. After recrystallization from 95 percent ethanol, the o-(4-hydroxybenzoyl) benzoate salt of N-[β-(o-chlorophenyl)-β-hydroxyethyl]-isopropylamine melted at about 217–217.5° C.

*Analysis.*—Calculated: C, 65.86; H, 5.75; N, 3.07; Cl, 7.78. Found: C, 65.80; H, 5.96; N, 3.00; Cl, 7.39 ($H_2O$, 0.378).

The o-(4-hydroxybenzoyl) benzoate salt of N-[β-(o-chlorophenyl)-β-hydroxyethyl]-isopropylamine was soluble in water at 27° C. to the extent of about 0.6 mg./ml.

The N-[β-(o-chlorophenyl)-β-hydroxyethyl]-isopropylamine content of the salt was found to be 46.2 percent as compared with the theoretical amount of 46.7 percent.

For therapeutic use, the o-(4-hydroxybenzoyl) benzoate salt of N-[β-(o-chlorophenyl)-β-hydroxyethyl]-isopropylamine can be mixed with a pharmaceutical extending agent, such as lactose, starch or the like, together with adjuvants, binders, and the like, and then placed in telescoping gelatin capsules, or pressed into tablets. Dose amounts of 25 to 100 mg. per dose are employed, depending on the age and weight of the patient, and the severity of the condition to be treated.

I claim:

The o-(4-hydroxybenzoyl) benzoate salt of N-[β-(o-chlorophenyl)-β-hydroxyethyl]-isopropylamine.

References Cited in the file of this patent

UNITED STATES PATENTS 2,816,059   Mills _____ Mar. 7, 1956

OTHER REFERENCES

Thomas: Anhydrous Aluminum Chloride in Organic Chemistry, p. 229 (1941).